(12) United States Patent
Löwstedt et al.

(10) Patent No.: US 11,969,685 B2
(45) Date of Patent: Apr. 30, 2024

(54) DISPOSABLE AIR FILTER UNIT, AN AIR CLEANER ASSEMBLY AND AN AIR CLEANER ARRANGEMENT

(71) Applicant: Volvo Truck Corporation, Gothenburg (SE)

(72) Inventors: Carl Löwstedt, Onsala (SE); Pär Wikberg, Gothenburg (SE); Leo Ekbom, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 706 days.

(21) Appl. No.: 17/251,225

(22) PCT Filed: Jun. 11, 2018

(86) PCT No.: PCT/EP2018/065385
§ 371 (c)(1),
(2) Date: Dec. 11, 2020

(87) PCT Pub. No.: WO2019/238212
PCT Pub. Date: Dec. 19, 2019

(65) Prior Publication Data
US 2021/0260515 A1    Aug. 26, 2021

(51) Int. Cl.
*B01D 46/24* (2006.01)
*B01D 46/00* (2022.01)
(Continued)

(52) U.S. Cl.
CPC ..... *B01D 46/2414* (2013.01); *B01D 46/0005* (2013.01); *B01D 46/521* (2013.01);
(Continued)

(58) Field of Classification Search
CPC ............... B01D 46/2414; B01D 46/88; B01D 46/0005; B01D 46/521; B01D 2271/022;
(Continued)

(56) References Cited

U.S. PATENT DOCUMENTS

| 5,897,676 A | 4/1999 | Engel et al. |
| 6,379,410 B1 | 4/2002 | Dudley |

(Continued)

FOREIGN PATENT DOCUMENTS

| CN | 1261291 A | 7/2000 |
| CN | 101472654 A | 7/2009 |

(Continued)

OTHER PUBLICATIONS

Chinese First Office Action dated Nov. 15, 2021 for Chinese Patent Application No. 201880094389.7, 22 pages (including English summary).

(Continued)

*Primary Examiner* — Syed O Hasan
(74) *Attorney, Agent, or Firm* — Sage Patent Group

(57) ABSTRACT

A disposable air filter unit for filtering air intake to an internal combustion engine forms a cylindrical sleeve about a central axis, and has an outer sleeve surface for receiving unfiltered air and an inner sleeve surface for output of filtered air. The disposable air filter unit includes a pleated filter component and a bioplastic reinforcement structure arranged at the pleated filter component. An air cleaner assembly includes a disposable air filter unit and a reusable carrier structure on which the air filter unit is removably arranged. The disposable air filter unit forms a sleeve about a central axis extending axially between a first end surface and a second end surface. The reusable carrier structure includes a receiving member for receiving the first end surface of the air filter unit and a sealing member arranged at the receiving member to contact the first end surface of the air filter unit.

20 Claims, 15 Drawing Sheets

(51) Int. Cl.
 *B01D 46/52* (2006.01)
 *B01D 46/88* (2022.01)
 *F02M 35/02* (2006.01)
 *F02M 35/024* (2006.01)

(52) U.S. Cl.
 CPC ......... *B01D 46/88* (2022.01); *F02M 35/0201* (2013.01); *F02M 35/0245* (2013.01); *B01D 2271/022* (2013.01); *B01D 2279/60* (2013.01)

(58) Field of Classification Search
 CPC ........... B01D 2279/60; F02M 35/0201; F02M 35/0245
 See application file for complete search history.

(56) References Cited

U.S. PATENT DOCUMENTS

| | | | |
|---|---|---|---|
| 7,168,573 | B2 | 1/2007 | Brown et al. |
| 7,887,704 | B2 | 2/2011 | Jiang et al. |
| 10,661,202 | B2 | 5/2020 | Bentlohner et al. |
| 10,767,606 | B2 | 9/2020 | Morikawa |
| 2003/0226800 | A1 | 12/2003 | Brown et al. |
| 2004/0065602 | A1 | 4/2004 | Moscaritolo et al. |
| 2007/0113529 | A1 | 5/2007 | Gierer |
| 2011/0247582 | A1* | 10/2011 | Blossey ............. B01D 46/2411 123/198 E |
| 2014/0223868 | A1 | 8/2014 | Kaufmann et al. |
| 2016/0354716 | A1 | 12/2016 | Seo et al. |
| 2018/0245548 | A1* | 8/2018 | Varghese ........... B01D 46/2414 |
| 2019/0015770 | A1* | 1/2019 | Scott ................ F02M 35/02483 |

FOREIGN PATENT DOCUMENTS

| | | | | |
|---|---|---|---|---|
| CN | 204783356 | U | * 11/2015 | ......... B01D 46/0015 |
| CN | 105688543 | A | 6/2016 | |
| CN | 106237726 | A | 12/2016 | |
| CN | 108119265 | A | 6/2018 | |
| DE | 202008010504 | U1 | 12/2009 | |
| EP | 0357917 | A1 | 3/1990 | |
| EP | 0562502 | A1 | 9/1993 | |
| EP | 0676228 | A1 | 10/1995 | |
| EP | 0991459 | A1 | 4/2000 | |
| EP | 2086663 | B2 | 4/2018 | |
| GB | 1583736 | A1 | 2/1981 | |

OTHER PUBLICATIONS

International Search Report and Written Opinion of the International Searching Authority, PCT/EP2018/065385, dated Apr. 16, 2019, 20 pages.

International Preliminary Report on Patentability of the International Preliminary Examining Authority, PCT/EP2018/065385, dated Sep. 11, 2020, 18 pages.

* cited by examiner

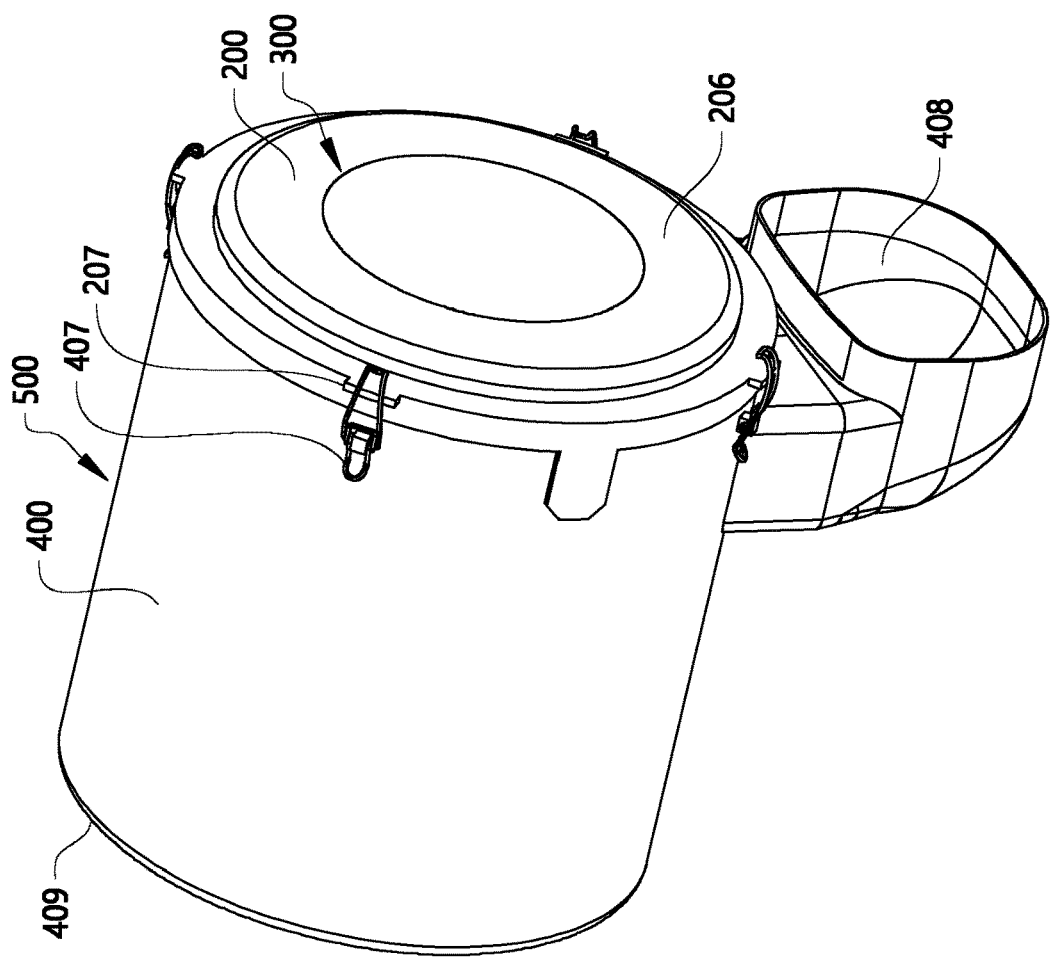
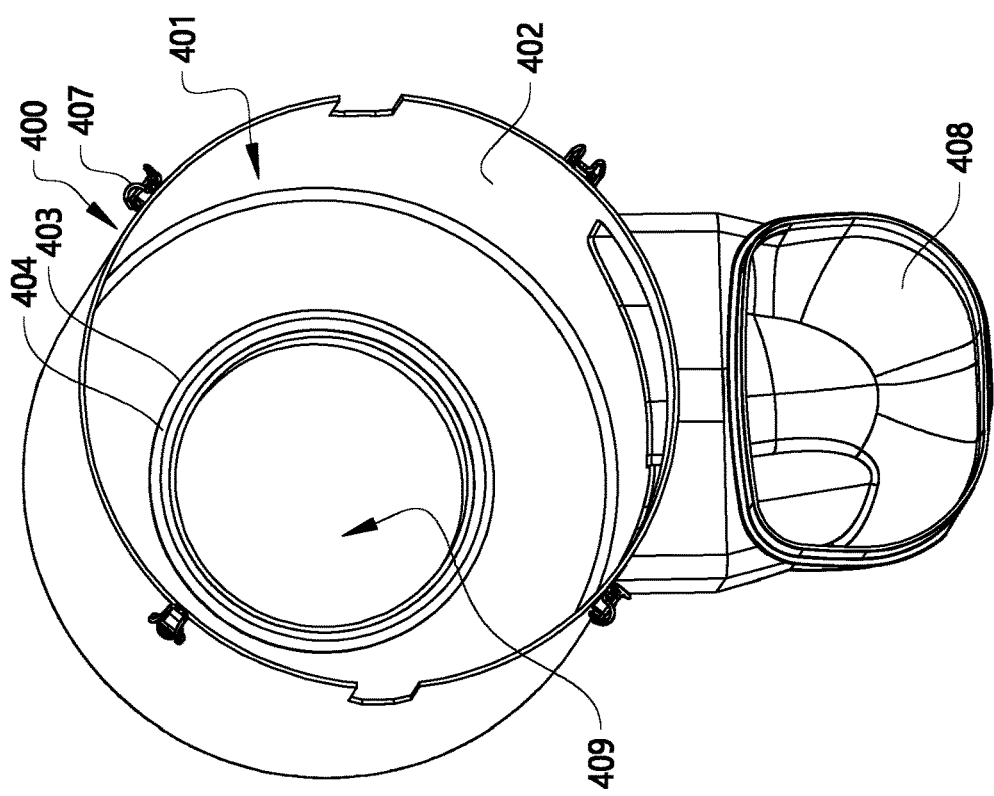
FIG. 5b
FIG. 5a

DISPOSABLE AIR FILTER UNIT, AN AIR CLEANER ASSEMBLY AND AN AIR CLEANER ARRANGEMENT

CROSS REFERENCE TO RELATED APPLICATIONS

This application is a 35 U.S.C. § 371 national stage application of PCT International Application No. PCT/EP2018/065385 filed on Jun. 11, 2018, the disclosure and content of which are incorporated by reference herein in its entirety.

TECHNICAL FIELD

The invention relates to a disposable air filter unit for filtering air intake to an internal combustion engine in a vehicle. The air filter unit forms a cylindrical sleeve about a central axis (X) and extends axially between a first end and a second end. The air filter unit forms an outer sleeve surface for receiving unfiltered air, and an inner sleeve surface for output of filtered air. The invention also relates to an air cleaner assembly for an air cleaner arrangement in a vehicle, comprising a disposable air filter unit and a reusable carrier structure to which said air filter unit is removably arranged. Moreover, the invention relates to an air cleaner arrangement, a method and a vehicle.

The invention can be applied in heavy-duty vehicles, such as trucks, buses and construction equipment. Although the invention will be described with respect to a truck, the invention is not restricted to this particular vehicle, but may also be used in other vehicles such as buses and construction equipment.

BACKGROUND

An internal combustion engine receives air to combust fuel in a combustion chamber to produce power. Such an engine is provided with an intake system in order to supply air from the outside of the vehicle to the internal combustion engine.

The air intake system of a vehicle may include an air intake followed by an intake duct, for supplying air to an air cleaner arrangement. The air cleaner arrangement typically comprises an air cleaner housing in which an air filter is arranged, to filter the air from dust by passage through the air filter before reaching the internal combustion engine. Air cleaner arrangements and air filters may be designed in many different shapes and configurations. The most common solution in today's trucks is to use a cylindrical air cleaner with a cylindrical air filter.

The air filter needs to be replaced on a regular basis (from e.g. every month to every second year) to keep the air cleaning function on a desired level. The replacement of the air filter is time consuming, and may often involve work being unergonomic for the service technician.

The used air filters are disposed. Conventionally, the air filters consists of a pleated filter media that is shaped into a cylinder where the ends are casted together with a PUR (polyureathane) material to provide radial and axial seal, and which is further provided with a plastic inner cage to provide axial strength. Disposal of units is inefficient when it comes to sustainability, with wastes in production, transportation and disposal.

US 2014/0223868 discloses an air filter system having a housing and at least one detachable cover detachably connected to the housing to close off the housing. At least one exchangeable element is arranged within the housing.

As such, it would be desirable to facilitate the replacement of an air filter in an air cleaner arrangement. Also, it would be desirable to improve sustainability and/or economy for disposable air filters.

SUMMARY

An object of the invention is to provide an air filter and/or an air cleaner arrangement, which provides for improved sustainability and/or economy when discarded, and/or for improved ergonomics during replacement.

The object is achieved by a disposable air filter unit according to claim 1.

As such, the invention relates to a disposable air filter unit for filtering air intake to an internal combustion engine in a vehicle, the air filter unit forming a cylindrical sleeve about a central axis (X) and extending axially between a first end and a second end, the air filter unit forming an outer sleeve surface for receiving unfiltered air, and an inner sleeve surface for output of filtered air. The disposable air filter unit comprises a pleated filter component forming a cylindrical sleeve about said central axis (X) and extending axially between a first end surface and a second end surface, the pleated filter component forming an outer sleeve surface for receiving unfiltered air, and an inner sleeve surface for output of filtered air. The disposable air filter unit comprises at least one bioplastic reinforcement structure arranged at the pleated filter component.

With bioplastic reinforcement structure is meant a component made of bioplastic material(s). With bioplastics is meant herein plastics derived from renewable biomass sources, such as vegetable fats and oils, corn starch, or microbiota. Bioplastic can be made from agricultural by-products and also from used plastic bottles and other containers using microorganisms.

Bioplastics are hence advantageous out of a sustainability perspective initially because they are made of renewable sources or at least out of recycled resources.

Preferably, the bioplastic is a bioplastic from renewable biomass sources.

Advantageously, the bioplastic may be a biodegradable material.

Optionally, the bioplastic may be a PolyLacticAcid (PLA) material.

Advantageously the pleated filter component is a conventional pleated filter component. Optionally, the pleated filter component may be made from renewable biomass sources. Optionally, the pleated filter component may be made from recycled resources. Optionally, the pleated filter component is a biodegradable material.

Hence, optionally the disposable air filter unit is biodegradable.

Optionally, the disposable air filter unit consists of said pleated filter component and said bioplastic reinforcement structure.

Optionally, the at least one bioplastic reinforcement structure is directly adhered to the pleated filter component or is a separate component attached to the filter component.

When the bioplastic reinforcement structure is directly adhered to the pleated filter component, it may be moulded directly onto the pleated filter component, such that the bioplastic reinforcement structure material adheres to the pleated filter component without need for additional fastening elements such as glue.

When the bioplastic reinforcement structure is a separate component attached to the filter component the bioplastic reinforcement structure may be formed separately, and then attached to the filter component e.g. by gluing.

Optionally, the reinforcement structure is arranged to at least one, preferably both of said first and second end surfaces of the filter component. Hence, the reinforcement structure may axially seal the filter component. Moreover, the reinforcement structure may provide flat surfaces to seal against when the disposable filter unit is arranged in an air cleaner arrangement.

Preferably, the reinforcement structure is applied so as to cover substantially the entire first and/or second end surface. Hence, the reinforcement structure may constitute said first and second end of the entire filter component.

Optionally, the bioplastic reinforcement structure extends along the inner sleeve surface of the pleated paper filter component. Advantageously, the bioplastic reinforcement structure extends along the inner sleeve surface forming a cage structure, so as to allow air to be filtered to pass the filter unit from the outer surface to the inner surface. Optionally, the bioplastic reinforcement structure may extend axially along a full length of the inner sleeve surface of the filter component.

Optionally, the bioplastic reinforcement structure forms at least one axially extending guiding means along the inner sleeve surface of the filter. Such axially extending guiding means may guide axial movement of the filter unit in relation to other parts in an air cleaner arrangement, when the disposable filter unit is to be applied to or removed from the air cleaner arrangement.

Optionally, the bioplastic reinforcement structure has a uniform thickness being between 2 mm and 20 mm, preferably between 4 and 15 mm.

Optionally, the outer sleeve surface of the air filter unit forms a diameter being 200-400 mm, and/or an axial length between said first end and said second end of the air filter unit is 300 to 500 mm.

Optionally, the pleated filter unit has a radial depth of pleats being 35 mm to 70 mm.

In a second aspect, the invention relates to an air cleaner assembly for an air cleaner arrangement in a vehicle, comprising a disposable air filter unit and a reusable carrier structure to which said air filter unit is removably arranged. The disposable air filter unit forms a sleeve about a central axis (X), extending axially between a first end surface and a second end surface, and forms an outer sleeve surface for receiving unfiltered air, and an inner sleeve surface for output of filtered air. The reusable carrier structure comprises a receiving member for receiving said first end surface of the air filter unit, and a sealing member arranged at the receiving member, to contact said first end surface of the air filter unit.

The air cleaner assembly comprising a disposable air filter unit and a reusable carrier structure may be used for attaching and removing the disposable air filter unit to an air cleaner arrangement. The air cleaner assembly may be removable from the air cleaner arrangement, such that the disposable air filter unit may be removed from the reusable carrier structure and replaced by a new disposable air filter unit. Hence, more ergonomic working positions may be assumed.

Accordingly, the receiving member may be adapted to realeasably lock said filter unit to said reusable carrier structure in an axial direction, for example by mechanical locking such as by press-fit or snap-lock.

Optionally, the receiving member may be annular so as to receive the first end surface of the air filter unit.

The reusable carrier structure comprises a receiving member for receiving a first end surface of the air filter unit. The sealing member being arranged at the receiving member, enables sealing contact with the first end surface of the air filter unit. Accordingly, the air filter unit per se may be devoid of sealing members, which diminishes the amount of material in the filter unit which is to be discarded.

Optionally, the sealing member is an annular member, for example an oring.

Optionally, the reusable carrier structure comprises a support member extending axially from said receiving member to a free end, the support member being adapted to be surrounded by said inner sleeve surface of the air filter unit.

Optionally, the first sealing member may extend annularly around said support member.

Optionally, the support member comprises axially extending guiding means for guiding said air filter unit during attachment and removal thereof from the reusable carrier structure.

Optionally, the support member may be adapted to realeasably lock said filter unit to said reusable carrier structure in an axial direction, for example by mechanical locking such as by press-fit or snap-lock.

Optionally, the free end of the support member comprises connecting means for connecting said free end to an air filter housing.

Optionally, the reusable carrier structure comprises an enclosure portion adapted to form part of a filter enclosure of an air filter housing.

Optionally, when the reusable carrier structure comprises a support member as described in the above, an axial length of the support member from the receiving member to the free end corresponds to at least 20% of the length between the first end surface and the second end surface of the filter unit, more preferred corresponding to at least 75% of the length between said first end surface and said second end surface of the filter unit, most preferred corresponding to at least the length between said first end surface and said second end surface of the filter unit.

Optionally, the reusable carrier structure forms one single element when in use.

In a third aspect, the invention relates to an air cleaner arrangement comprising a filter housing, and a reusable carrier structure for carrying a disposable air filter unit, which air filter unit is forming a sleeve about a central axis (X) and extending axially between a first end surface and a second end surface and defining an outer sleeve surface for receiving unfiltered air, and an inner sleeve surface for output of filtered air. The reusable carrier structure comprises a first receiving member for receiving the first end of the air filter unit, and a first sealing member arranged at the receiving member, the first sealing member being adapted to interact with said first end surface of the air filter unit. The filter housing defines an air filter cavity having an inner wall, the inner wall comprising a second receiving member for receiving the second end surface of the air filter unit, and a second sealing member arranged at the second receiving member, the second sealing member being adapted to interact with said second end surface of the air filter unit.

Hence, in the air cleaner arrangement, the first and second sealing members providing the necessary sealing between the filter unit and the air cleaner arrangement, are both provided in the air cleaner arrangement, meaning that the filter unit may be devoid of sealing members.

The reusable carrier structure may in use be provided as a single member. The air filter unit may in use be provided as a single member.

Optionally, the first sealing member and the second sealing member are annular sealing members. Hence, sealing against the first and second end of the air filter unit may be ensured.

Optionally, the reusable carrier structure comprises a support member extending axially from said receiving member to a free end portion, the support member adapted to be surrounded by said inner sleeve surface of the air filter unit, said sealing member being arranged annularly around said support member.

Optionally, the inner wall of the filter cavity comprises a support member receiving element adapted to receive the free end portion of the support member of the reusable carrier structure.

Optionally, the second support member receiving element comprises an annular groove for receiving an edge of said free end portion, preferably said second sealing member is arranged radially outward of said annular groove.

Optionally, the reusable carrier structure comprises an enclosure portion adapted to complement the inner wall of the filter cavity, so as to, when the reusable carrier structure is arranged in the filter housing, join the inner wall of the filter cavity, so as to form a closed air filter compartment.

With closed air filter compartment is to be understood that the air filter compartment is closed but for the necessary air inlets and air outlets for transporting air through the air cleaner arrangement.

Optionally, the reusable carrier structure and/or the filter housing comprises axial and/or radial locking elements for axially and/or radially securing the reusable carrier structure to the filter housing.

Optionally, the filter housing further defines a peripherally arranged air inlet, and an axially arranged air outlet, said second receiving member and said second sealing member being arranged to surround said air outlet.

Optionally, the air cleaner arrangement comprises a disposable filter unit, said disposable filter unit being clamped between said first receiving member and said second receiving member, such that the first sealing member sealingly contacts the first end surface of the filter unit, and the second sealing member sealingly contacts the second end surface of the filter unit, when the air cleaner arrangement is in a use condition.

Optionally, the disposable filter unit is removable by axial removal of the reusable carrier structure from the filter housing from said use condition to an open condition.

In a fourth aspect the invention relates to a method for replacing a disposable air filter unit in an air cleaner arrangement comprising the steps of: removing the reusable support structure carrying a used air filter unit from the filter cavity of the filter housing; removing the used air filter unit from the reusable support structure; applying a disposable air filter unit to the reusable support structure; and introducing the reusable support structure into the filter cavity of the filter housing.

Optionally one or more, or all of said steps may be performed by axial relative movements.

In a fifth aspect, the invention relates to a vehicle comprising an air filter unit as described in the above, and/or an air filter assembly as described in the above and/or a filter arrangement as described in the above.

It will be understood that features and advantages described herein with reference to any aspect of the invention may equally be applied to the other aspects of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 3b is a schematic split view of the disposable air filter unit of FIG. 3a;

FIG. 4b is a split view of the air cleaner assembly of FIG. 4a;

FIG. 5a is a perspective view of an embodiment of a filter housing 400 for use in an embodiment of an air cleaner arrangement 500;

FIG. 5b is a perspective view of an embodiment of an air cleaner arrangement 500;

In FIGS. 3a to 7d, like reference numbers refer to similar features.

DETAILED DESCRIPTION OF EXAMPLE EMBODIMENTS OF THE INVENTION

The invention will be described below for a vehicle in the form of a truck 1 such as the truck illustrated in FIG. 1. The truck 1 should be seen as an example of a vehicle which could comprise an air supply arrangement according to the present invention and/or a separator as described herein.

However, the present invention may be implemented in a plurality of different types of vehicles. Purely by way of example, the present invention could be implemented in a truck, a tractor, a car, a bus, a work machine such as a wheel loader or an articulated hauler, or any other type of construction equipment.

Figure 1:
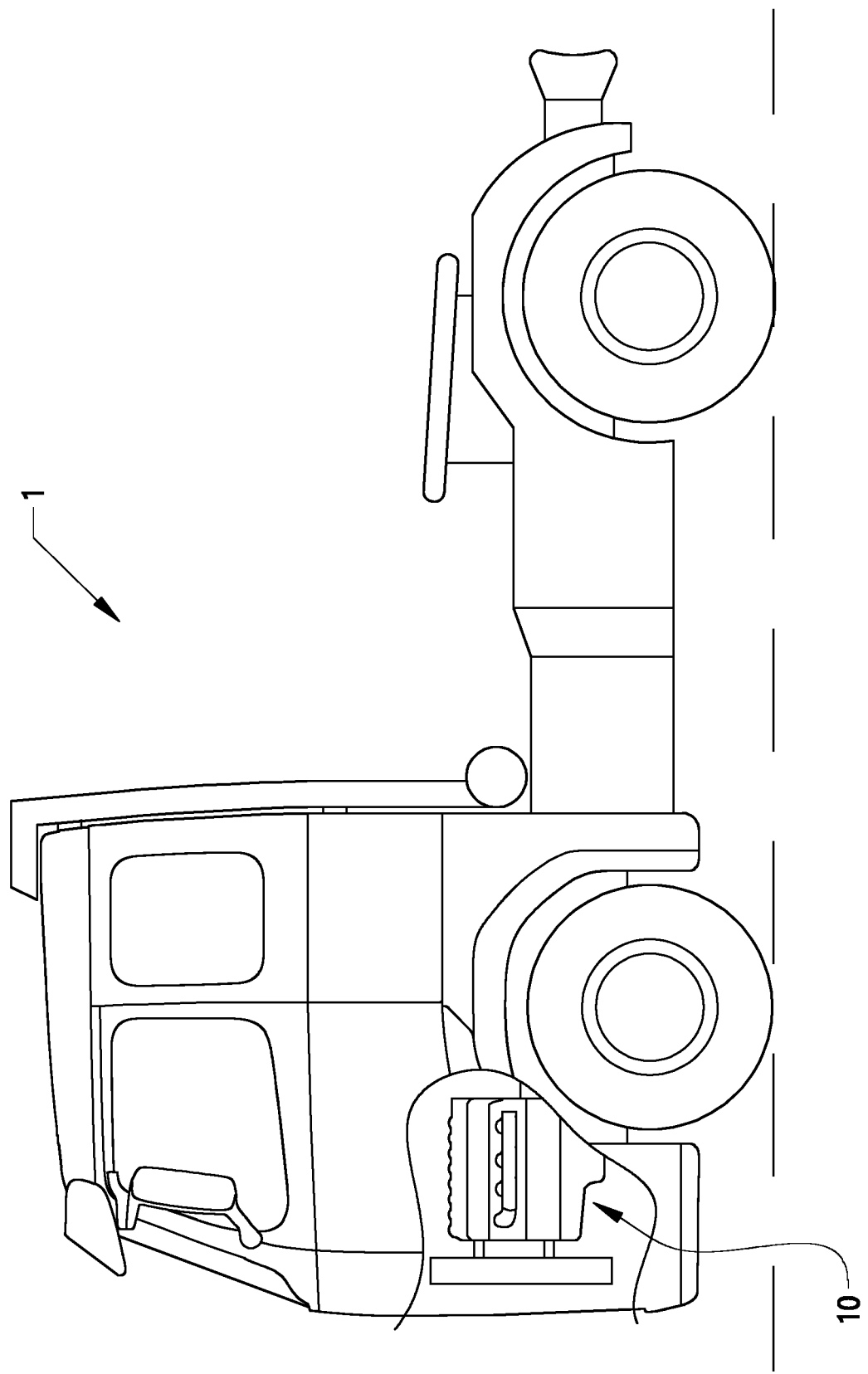
FIG. 1 is a schematic view of a vehicle.
Figure 2:
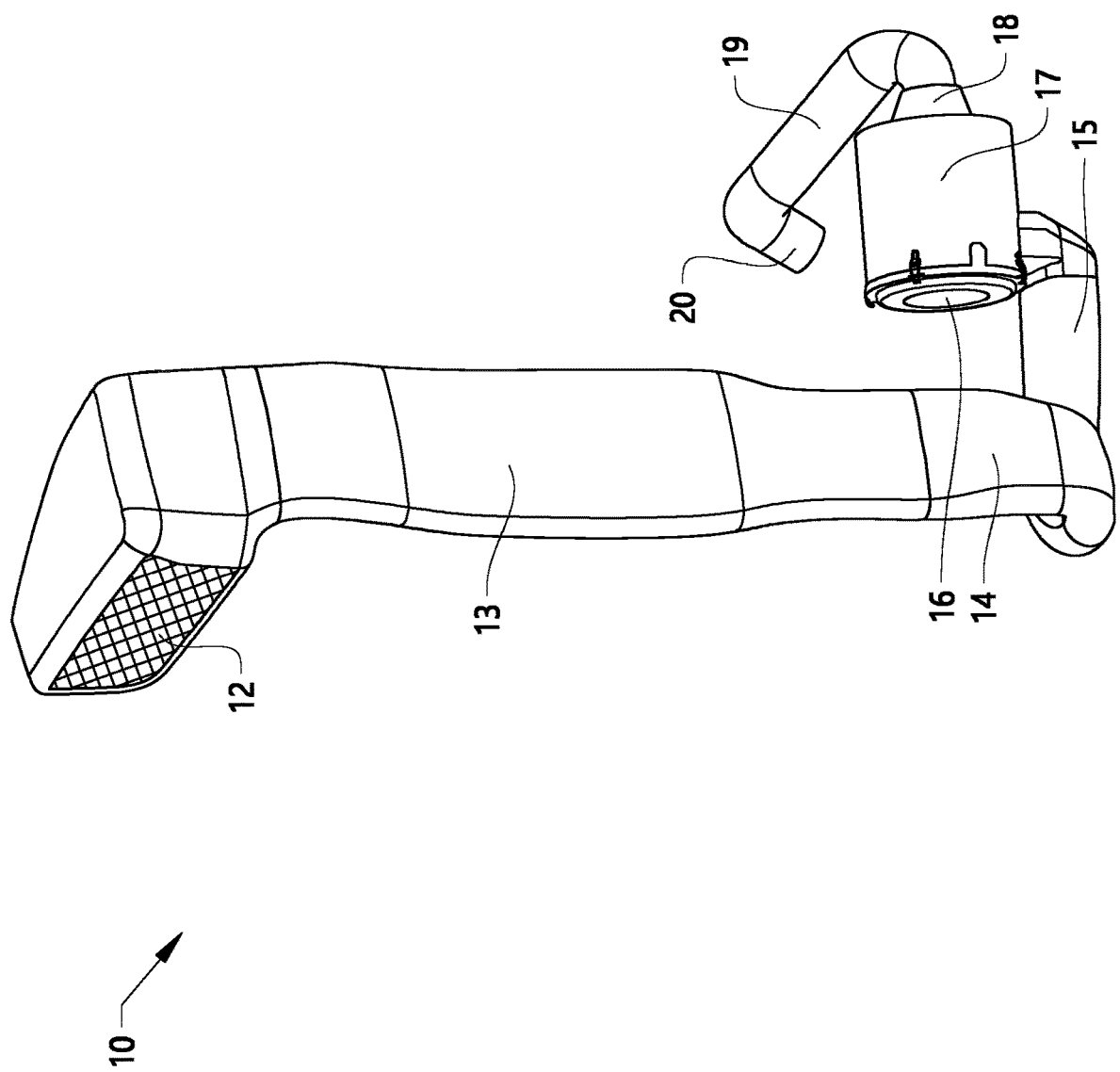
FIG. 2 is a schematic view of an air intake system.

The FIG. 1 vehicle 1 comprises an air intake system 10 as illustrated in FIG. 2. An air intake system 10 is generally arranged so as to supply air from the outside of a vehicle, e.g. from the outside of the cab, to an internal combustion engine of the vehicle.

The air intake system 10 of FIG. 2 will now be described as an example. However, it is to be understood that the present invention may be applied also in other variants of air intake systems.

The air intake system 10 of FIG. 2 comprises an air intake 12 in connection with outside air. The air intake 12 is in communication with an air duct 13 for transferring air further into the vehicle. The exemplified air duct 13 has an elongated shape which is arranged in a generally vertical direction (with respect to a vertical direction of the vehicle). The air duct 13 leads the air to a bellow 14, which in turn is connected to a turn chamber 15. From the turn chamber 15 the air is fed further downstream to an air cleaner 16, 17, comprising an air cleaner housing 17 and an air cleaner cover 16. Inside the air cleaner housing 17, an air filter is arranged (not visible in FIG. 2). The air cleaner cover 16 is removable from the air cleaner housing 17 so as to enable replacement of the air filter when necessary.

The air cleaner housing 17 is in connection with an air cleaner rubber bellow 18 which is in turn connected an intermediate pipe 19. Downstream the intermediate pipe 19, there is a turbo inlet, here in the form of a turbo inlet rubber bellow 20. From the turbo inlet, the air will continue downstream towards the internal combustion engine (not shown in FIG. 2).

It is to be understood that the illustrated air intake system 10 is exemplary, and that the invention may be applied to numerous variants of air intake systems.

In the following, exemplary embodiments of the invention will be described with reference to FIGS. 3a to 7d.

Figure 3A:
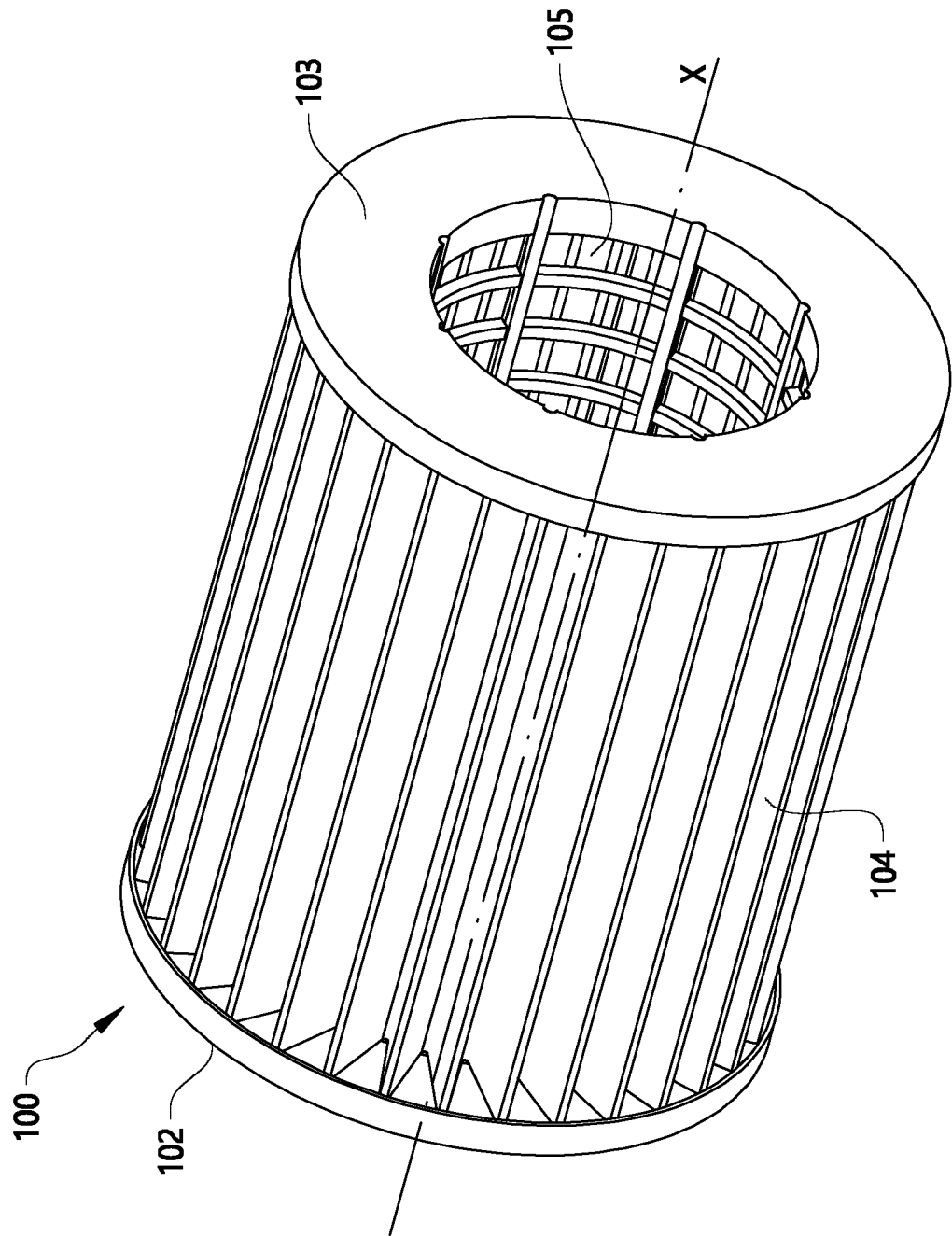
FIG. 3a is a schematic perspective view of an embodiment of a disposable air filter unit.

FIG. 3a is a schematic perspective view of an embodiment of a disposable air filter unit 100 for filtering air intake to an internal combustion engine in a vehicle. The air filter unit 100 forms a cylindrical sleeve about a central axis (X) and extends axially between a first end 102 and a second end 103. The air filter unit 100 forming an outer sleeve surface 104 for receiving unfiltered air, and an inner sleeve surface 105 for output of filtered air, when the filter unit 100 is in use in an air cleaner arrangement such as for example the arrangement described with reference to FIG. 2. Hence, the air filter unit 100 may be installed in an air cleaner housing 17 in an air intake system 10 as described in the above. However, it will be understood that the air filter unit 100 may be applied also in other air cleaner arrangements.

Figure 3B:
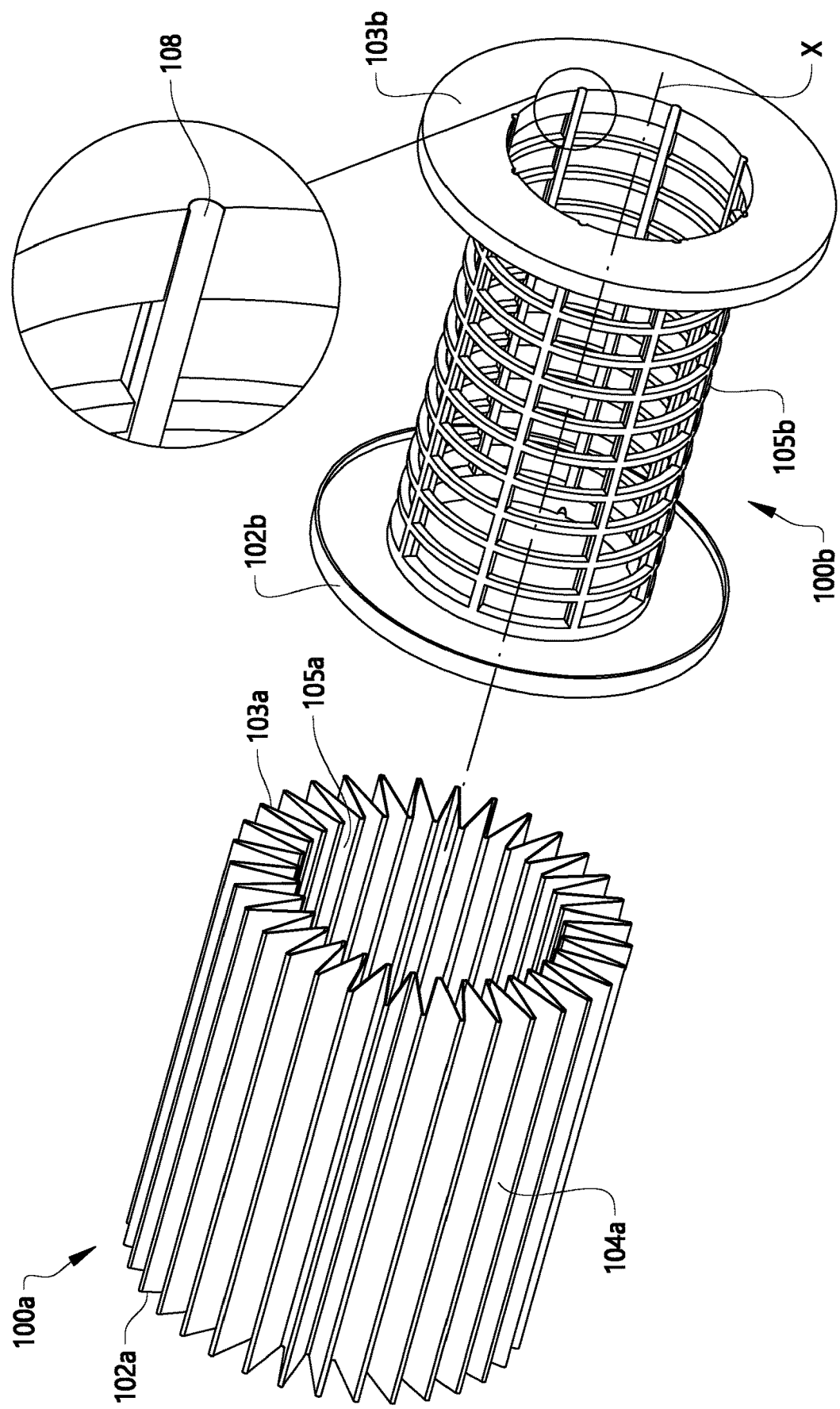

FIG. 3b is a split view of the air filter unit 100 of FIG. 3a. In the illustrated embodiment, the air filter unit 100 comprises a pleated filter component 100a and a bioplastic reinforcement structure 100b, arranged at the pleated filter component 100a.

The pleated filter component 100a forms a cylindrical sleeve about said central axis (X) and extends axially between a first end surface 102a and a second end surface 103a. The pleated filter component 100a forms an outer sleeve surface 104a for receiving unfiltered air, and an inner sleeve surface 105a for output of filtered air. The pleats of the pleated filter component extend generally axially.

In the illustrated embodiment, the bioplastic reinforcement structure 100b comprises a first end surface 102b and a second end surface 103b. The end surfaces 102b, 103b are annular and adapted so as to cover the first end surface 102a and the second end surface 103a of the pleated filter component 100a. The end surfaces 102b, 103b of the bioplastic reinforcement structure are connected by an axially extending, sleeve-shaped cage 105b. The cage 105b is adapted to fit inside the inner sleeve surface 105a.

The cage 105b is formed so as to allow air to pass through the filter unit 100 from the outer sleeve surface 104 to the inner sleeve surface 105. In contrast, the end surfaces 102b, 103b of the bioplastic reinforcement structure are adapted so as to hinder air from escaping via the end surfaces 102, 103 of the filter unit 100.

It will be understood that numerous variants of the shape of the bioplastic reinforcement structure 100b are possible.

The bioplastic reinforcement structure 100b is made of a bioplastic material as defined in the above. In particular, in a preferred embodiment, the bioplastic reinforcement structure is a bioplastic from renewable biomass sources which is biodegradable, such as a PolyLacticAcid (PLA) material.

As mentioned in the above, the bioplastic reinforcement structure 100b may be directly adhered to the pleated filter component 100a, for example, end surfaces 102b, 103b may be directly moulded onto the end surfaces 102a, 103a of the pleated filter member 100a.

Optionally, the bioplastic reinforcement structure 100b may comprise one or more a separate component(s) attached to the filter component 100a. The bioplastic reinforcement structure 100b may be attached e.g. by an adhesive.

The bioplastic reinforcement structure 100b may comprise at least one axially extending guiding means 108 along the inner sleeve surface 105 of the filter 100. As in the illustrated embodiment, the axially extending guiding means 108 may comprise an axially extending groove or ridge in the bioplastic reinforcement structure 100b. The axially extending groove or ridge may extend through the first end 102b, second end 103b, and the cage 105b of the bioplastic reinforcement structure 100b. In the illustrated embodiment, a plurality of axially extending grooves 108 are arranged circumferentially about the inner circumference of the bioplastic reinforcement structure 100b.

The axially extending guiding means 108 are to be adapted to fit with corresponding guiding means 208 in a carrier structure 200, which will be described later.

The bioplastic reinforcement structure 100b may have a uniform thickness being between 2 mm and 20 mm, preferably between 4 and 15 mm.

For example, the outer sleeve surface 104 of the disposable filter unit 100 of FIGS. 3a, 3b may form an outer diameter of 200-400 mm, and an axial length between said first end 102 and said second end 103 may be 300 to 500 mm.

The disposable filter unit 100 of FIGS. 3a, 3b consists only of the pleated filter component 100a and said one or more bioplastic reinforcement structure 100b. Accordingly, the disposable filter unit 100 may be made only of renewable sources, and may optionally also be biodegradable. Accordingly, production and disposal of the filter unit 100 may be rendered more sustainable than with previous alternatives.

Figure 4A:
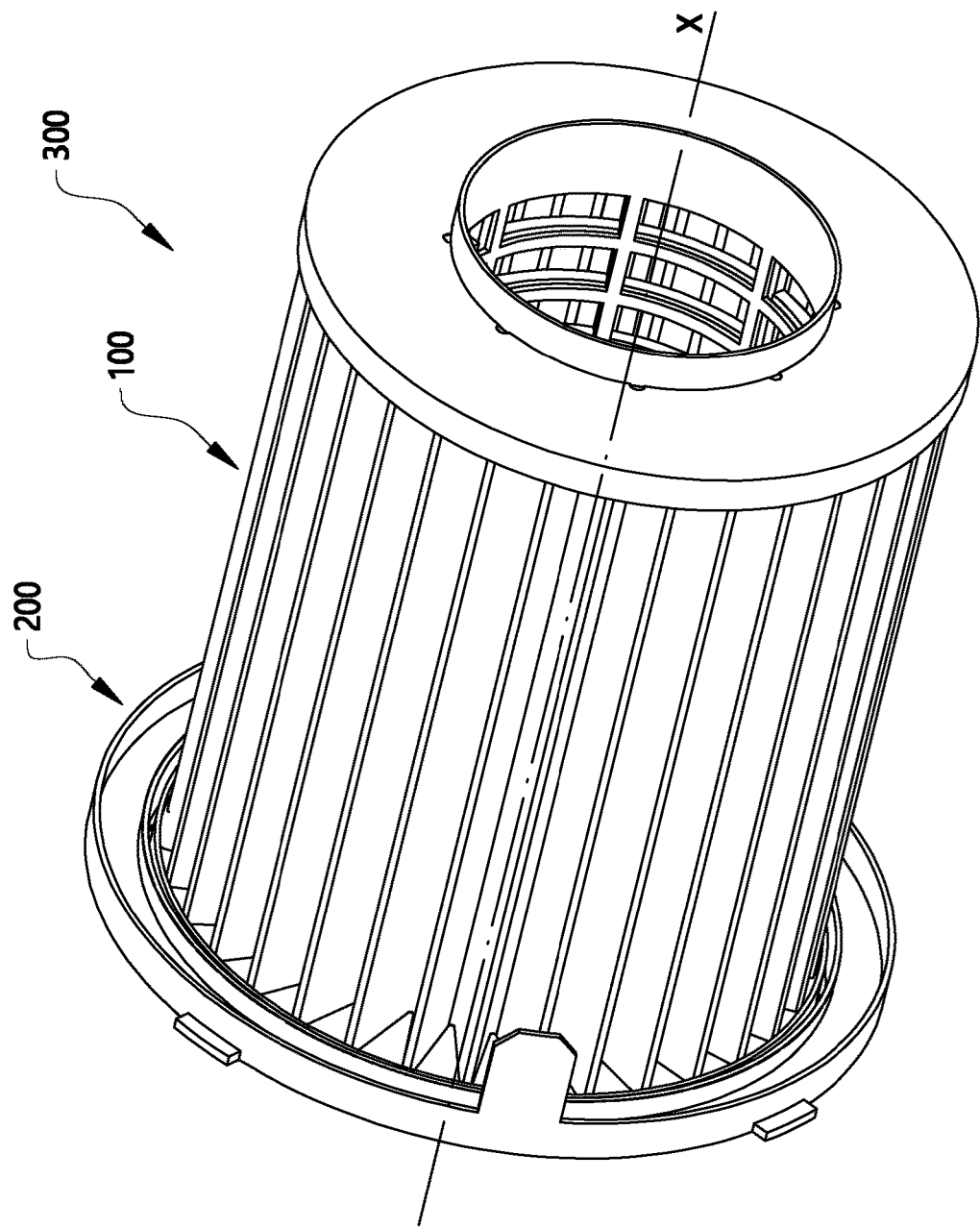
FIG. 4a is a schematic perspective view of a first embodiment of an air cleaner assembly.

FIG. 4a is a perspective view of an air cleaner assembly 300 for an air cleaner arrangement in a vehicle. The air cleaner arrangement 300 comprises a disposable air filter unit 100 and a reusable carrier structure 200 to which said air filter unit 100 is removably arranged. The disposable air filter unit 100 forms a sleeve about a central axis (X), extending axially between a first end surface 102 and a second end surface 103, and forms an outer sleeve surface 104 for receiving unfiltered air, and an inner sleeve surface 105 for output of filtered air. The air filter unit 100 may be an air filter unit as described in the above, for example an air filter unit 100 as described with reference to FIGS. 3a and 3a.

Figure 4B:
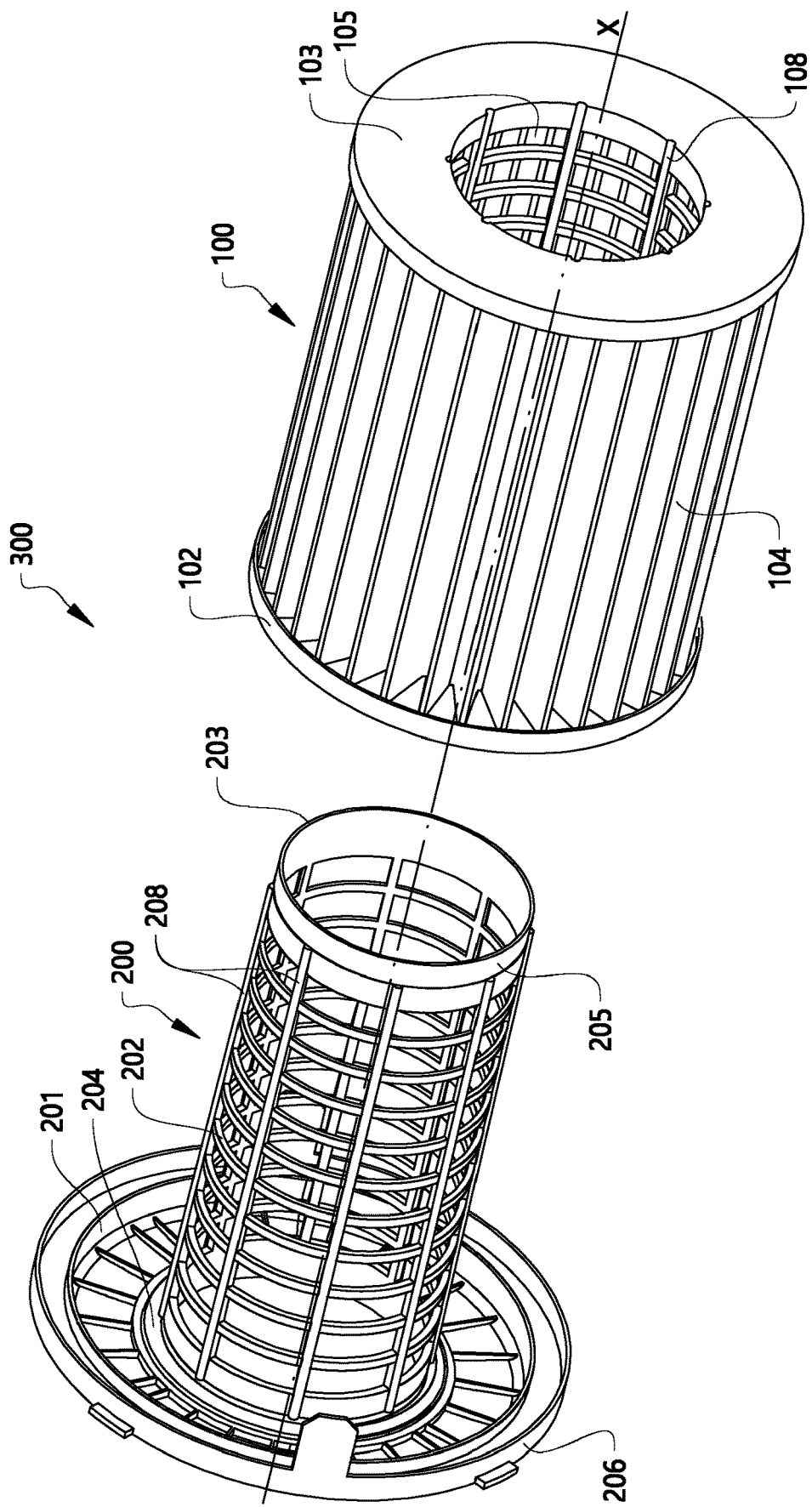

As best seen in FIG. 4b, which is a the split view of the air cleaner assembly 300 of FIG. 4a, the reusable carrier structure 200 comprises a receiving member 201 for receiving said first end surface 102 of the air filter unit 100, and a sealing member 204 arranged at the receiving member 201, to contact said first end surface 102 of the air filter unit 100.

It will be understood that the air cleaner assembly 300 may be assembled by arranging an air filter unit 100 on the reusable carrier structure 200. The air cleaner assembly 300 may then in turn be arranged in an air cleaner housing in an air cleaner arrangement, as will be further described in the below. The reusable carrier structure 200 comprises an enclosure portion 206 adapted to form part of a filter enclosure of an air filter housing 400. In the illustrated embodiment, the enclosure portion 206 forms a generally circular portion. This is convenient since the receiving member 201 will be generally annular in order to receive the first end 102 of the sleeve-shaped filter unit 100.

Further, the reusable carrier structure 200 comprises a sealing member 204 to seal against the first end surface 102 of the air filter unit 100. The sealing member 204 is an annular member extending at the receiving member 201 of the reusable carrier structure 200. Advantageously, the sealing member 204 may be an oring, for example arranged in a suitable groove.

Hence, the reusable carrier structure 200 performs the function of carrying a filter unit 100 into or out from a housing of an air cleaner arrangement, and moreover provides the sealing at a first end of the filter unit 100.

In the embodiment illustrated in FIGS. 4a and 4b, the reusable carrier structure 200 further comprises a support member 202 extending axially from said receiving member 201 to a free end 203. The support member 202 is adapted to be surrounded by the inner sleeve surface 105 of the air filter unit 100. As seen in FIG. 4b, the sealing member 204 extends annularly around said support member 202 so as to contact the first end portion 102 of the filter unit 100.

In the illustrated embodiment the support member 202 comprises axially extending guiding means 208 for guiding said air filter unit 100 during attachment and removal thereof from the reusable carrier structure 200. Here, the guiding means 208 comprises axially extending ridges corresponding to the axially extending grooves 108 of the filter unit 100.

Further, the free end 203 of the support member 202 comprises connecting means 205 for connecting said free end 203 to an air filter housing 400. In the illustrated embodiment, the connection means 205 comprises a circular edge which is adapted to fit into a corresponding groove of the air filter housing 400.

In the illustrated embodiment, the axial length of the support member 202 from the receiving member to the free end 203 exceeds the axial length of the filter unit 100 between the first end surface 102 and the second end surface 103. In this case, this enables the connection means 205 at the free end of 203 of the support member 202 to extend from the second end 203 of the filter unit 100, when in an assembled condition (FIG. 4a).

Other embodiments may be envisaged, wherein the axial length of the support member 202 from the receiving member 201 to the free end 203 is equal to or less than the axial length of the filter unit 100 between the first end surface 102 and the second end surface 103. For example, the axial length of the support member 202 from the receiving member 201 to the free end 203 may correspond to at least 20% of the length between the first end surface 102 and the second end surface 103 of the filter unit 100, more preferred corresponding to at least 75% of the length between said first end surface and said second end surface of the filter unit 100.

When the axial length of the support member 202 is less than the axial length of the filter unit 100, the corresponding filter housing 400 may instead be provided with a support member which extends so as to meet the support member 202 of the reusable carrier unit 200.

This is however not necessary. Instead, as will be described in the below, the air cleaner assembly 300 may be adapted to a housing 400 without any support structure extending all the way axially through the filter unit 100.

Figure 4C:
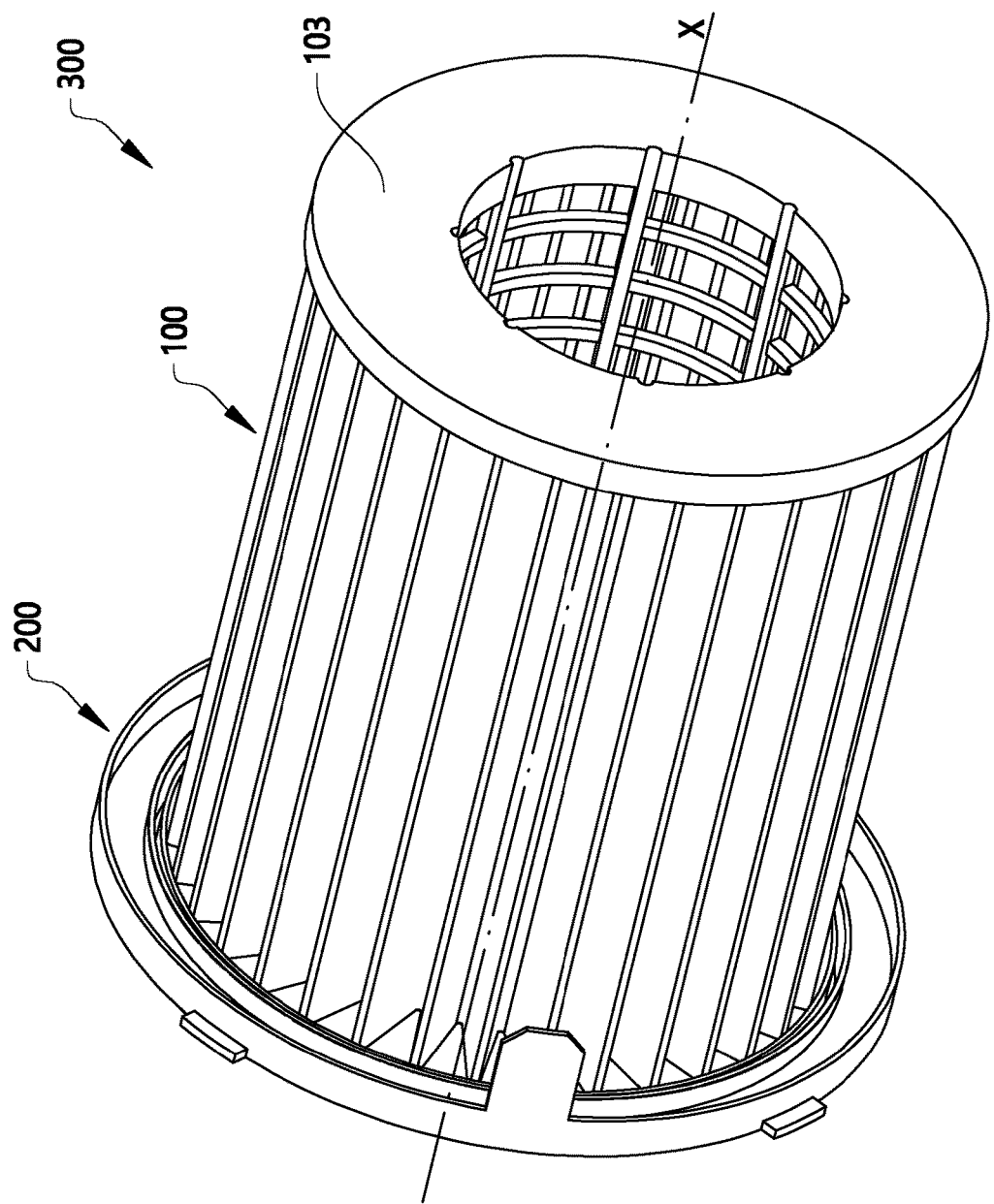
FIG. 4c is a schematic perspective view of a second embodiment of an air cleaner assembly.
Figure 4D:
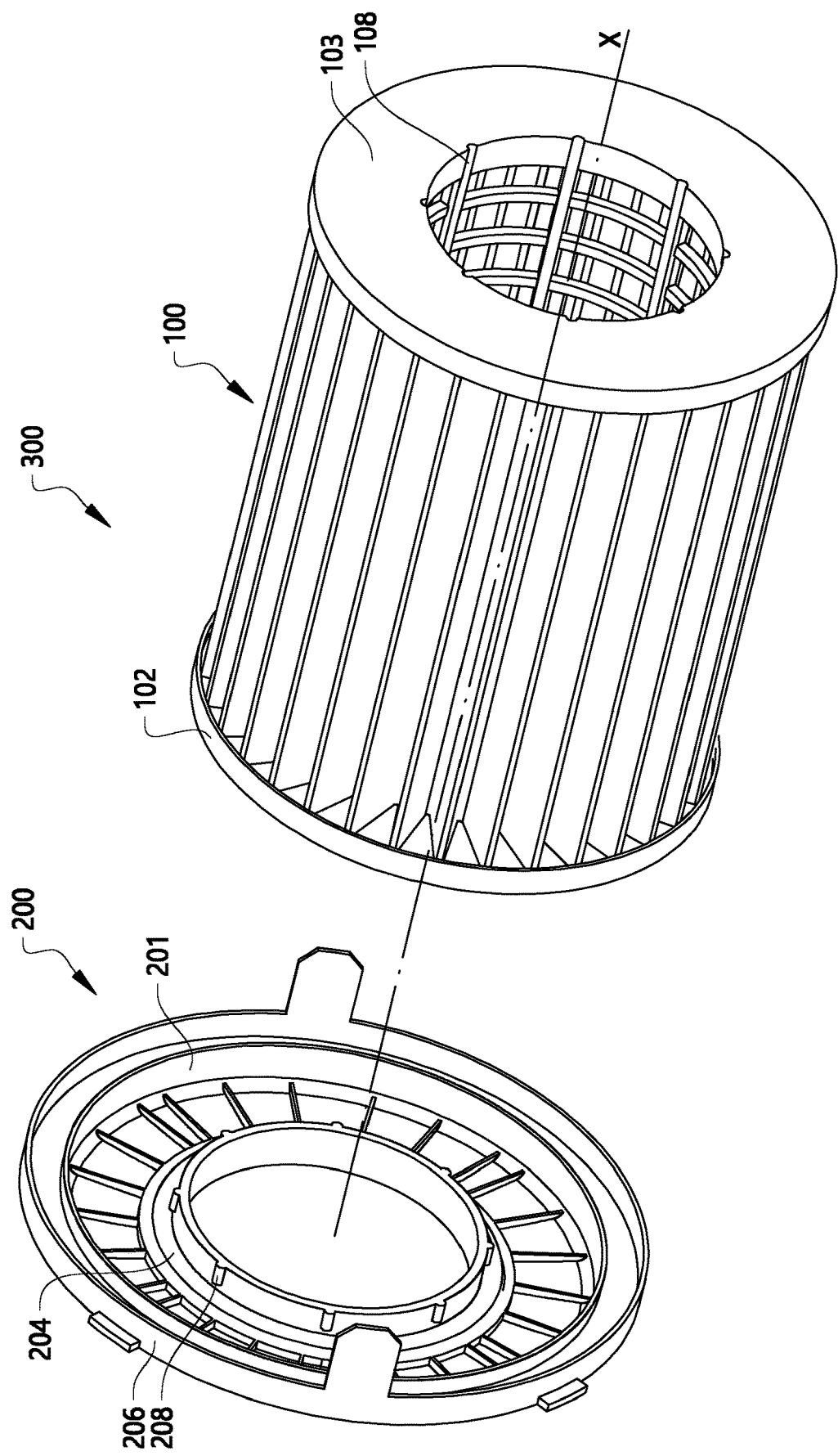
FIG. 4d is a split view of the air cleaner assembly of FIG. 4c.

FIGS. 4c and 4d illustrate an embodiment of an air cleaner assembly 300, wherein no support member 202 is present. The first end surface 102 of the air filter unit 100 is nevertheless received by the receiving member 201, and a sealing member 203 is arranged a the receiving member 201 to contact the first end surface 102 of the air filter unit 100. This is quite similar to what is described in the above with reference to FIGS. 4a and 4b, and reference is made to the description of the first embodiment for applicable parts.

Hence, in the second embodiment of FIGS. 4c and 4d, the reusable carrier structure 200 performs the function of carrying a filter unit 100 into or out from a housing of an air cleaner arrangement, and moreover provides the sealing at a first end of the filter unit 100, in a similar manner as the first embodiment of FIGS. 4a and 4b.

The reusable carrier structure 200, regardless of embodiment, is provided as one single member, meaning that it may be handled as such in use. The single member per say may naturally be made out of one or more assembled pieces.

The reusable carrier structure 200 may be made by any suitable reusable material, i.e. a material which withstands the stresses of continued use, for example a suitable plastic material.

Figure 6A:
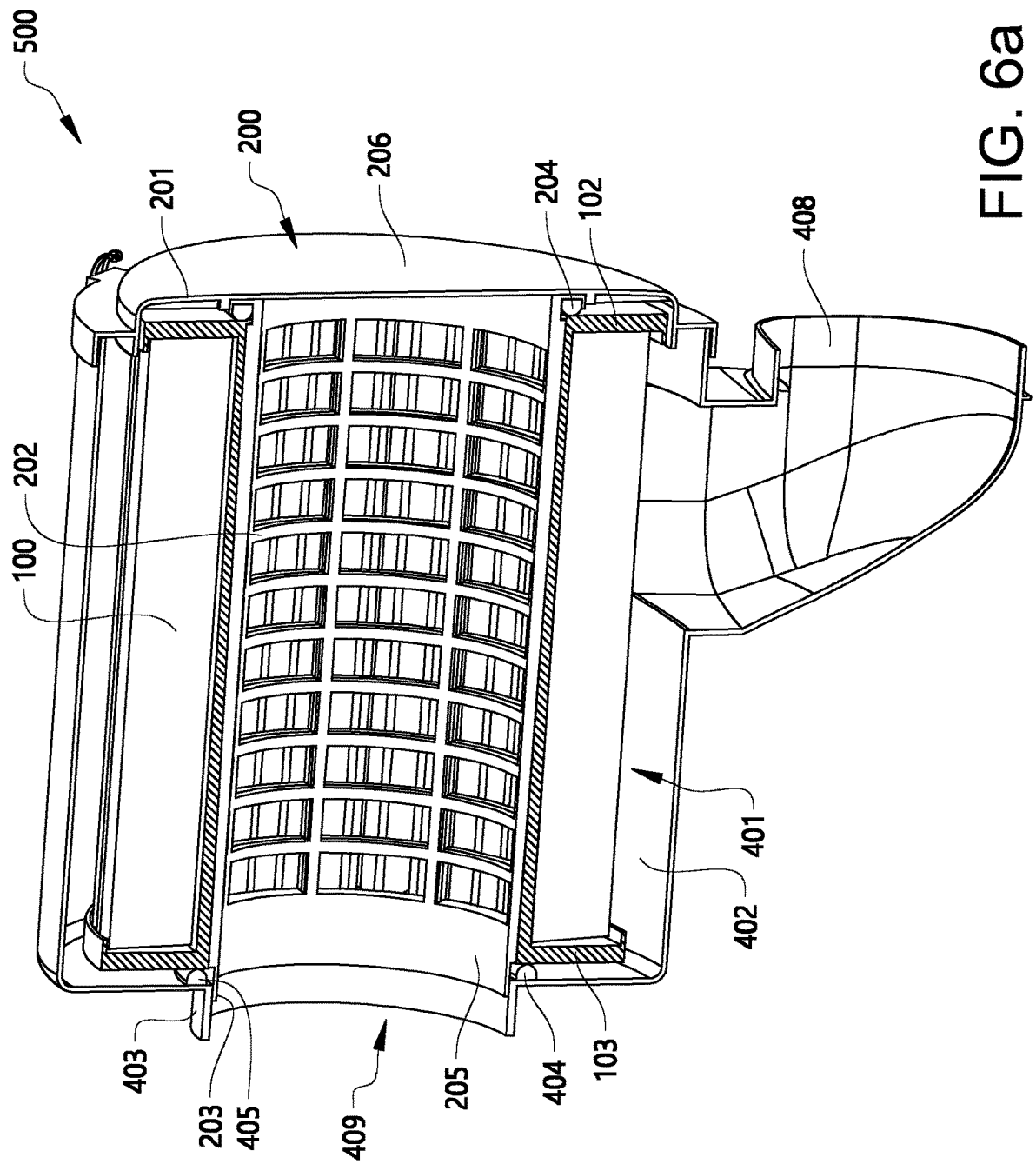
FIG. 6a is a cross-sectional view of an embodiment of an air cleaner arrangement 500 of FIG. 5b, comprising the housing of FIG. 5a, and the air cleaner assembly of FIGS. 4a, 4b.

FIG. 6a illustrates an air cleaner arrangement 500 comprising a filter housing 400, and a reusable carrier structure 200 for carrying a disposable air filter unit 100. The air filter unit 100 is forming a sleeve about a central axis (X) and extending axially between a first end surface 102 and a second end surface 103 and defining an outer sleeve surface 104 for receiving unfiltered air, and an inner sleeve surface 105 for output of filtered air. The air cleaner arrangement 500 may be used with any such air filter unit 100, but is particularly advantageous when used with a disposable air filter unit 100 as described in the above.

The reusable carrier structure 200 comprises a first receiving member 201 for receiving said first end 102 of the air filter unit 100, and a first sealing member 204 arranged at the receiving member 201, the first sealing member 204 being adapted to interact with said first end surface 102 of the air filter unit 100. Hence, the reusable carrier structure 200 may be as described in the above in relation to the air cleaner assembly 300. Indeed, when in use, the reusable carrier structure 200 will naturally carry a filter unit 100 so as to form such an air cleaner assembly 300. In the embodiment illustrated in FIG. 6, the reusable carrier structure 200 is as described in relation to the embodiment of FIGS. 4a and 4b in the above.

FIG. 5a illustrates a variant of a filter housing 400. The filter housing 400 defines an air filter cavity 401 for receiving the air filter 100. The air filter cavity 403 has an inner wall 402 comprising a second receiving member 403 for receiving the second end surface 103 of the air filter unit 100, and a second sealing member 404 arranged at the second receiving member 403, the second sealing member 404 being adapted to interact with said second end surface 103 of the air filter unit 100. In the illustrated embodiment, the air filter cavity 401 is adapted for axial introduction of the air filter 100.

The filter housing 400 further defines a peripherally arranged air inlet 408, and an axially arranged air outlet 409. Via the air inlet 408 and outlet 409, the filter housing 400 and hence the air cleaner arrangement 500 may be arranged in an air inlet system such as the one described in relation to FIG. 2.

As seen in FIG. 5a and FIG. 6a, the second receiving member 403 and the second sealing member 404 is arranged to surround said air outlet 409.

The second sealing member 404 is an annular member extending around the air outlet 409. Advantageously, the second sealing member 404 may be an oring, for example arranged in a suitable groove.

In FIG. 5b and FIG. 6a, an air cleaner arrangement 500 including a housing 400 as in FIG. 5a is illustrated. The air cleaner arrangement further comprises a reusable carrier structure 200.

As described in the above, the reusable carrier structure 200 comprises an enclosure portion 206 adapted to complement the inner wall 402 of the filter cavity 401, so as to, when the reusable carrier structure 200 is arranged in the filter housing 400, join the inner wall 402 of the filter cavity 401, so as to form a closed air filter compartment. In the illustrated embodiments, the enclosure portion 206 is generally circular, forming an axial end wall to be arranged at the generally circular opening to the filter cavity 401 of the filter housing 400.

The reusable carrier structure 200 and the filter housing 400 each comprise axial locking elements 207, 407 for axially securing the reusable carrier structure 200 to the filter housing 400. In the illustrated embodiment, the axial locking element 207 of the reusable carrier structure 200 comprises a loop, and the axial locking element 407 of the housing comprises a snap-down element for engaging said loop. Naturally, the loop and snap-down element could be otherwise arranged, or any other suitable axial locking elements may be used.

In an air cleaner arrangement as described in the above, a disposable filter unit 100 may be axially clamped between said first receiving member 203 and said second receiving member 403, such that the first sealing member 204 sealingly contacts the first end surface 102 of the filter unit 100, and the second sealing member 404 sealingly contacts the second end surface 103 of the filter unit 100, when the air cleaner arrangement 500 is in a use condition, as illustrated in FIG. 6a.

In the embodiment of FIG. 6a, the reusable carrier structure 200 further comprises a support member 202 as described in relation to FIGS. 4a and 4b. The support member 202 extends axially from said receiving member 201 to a free end portion 203, the support member 202 being adapted to be surrounded by said inner sleeve surface 105 of the air filter unit 100, and the sealing member 204 being arranged annularly around said support member 202.

Correspondingly, the inner wall 402 of the filter cavity 401 comprises a support member receiving element 405 adapted to receive the free end portion 203 of the support member 202 of the reusable carrier structure 200.

Figure 6B:
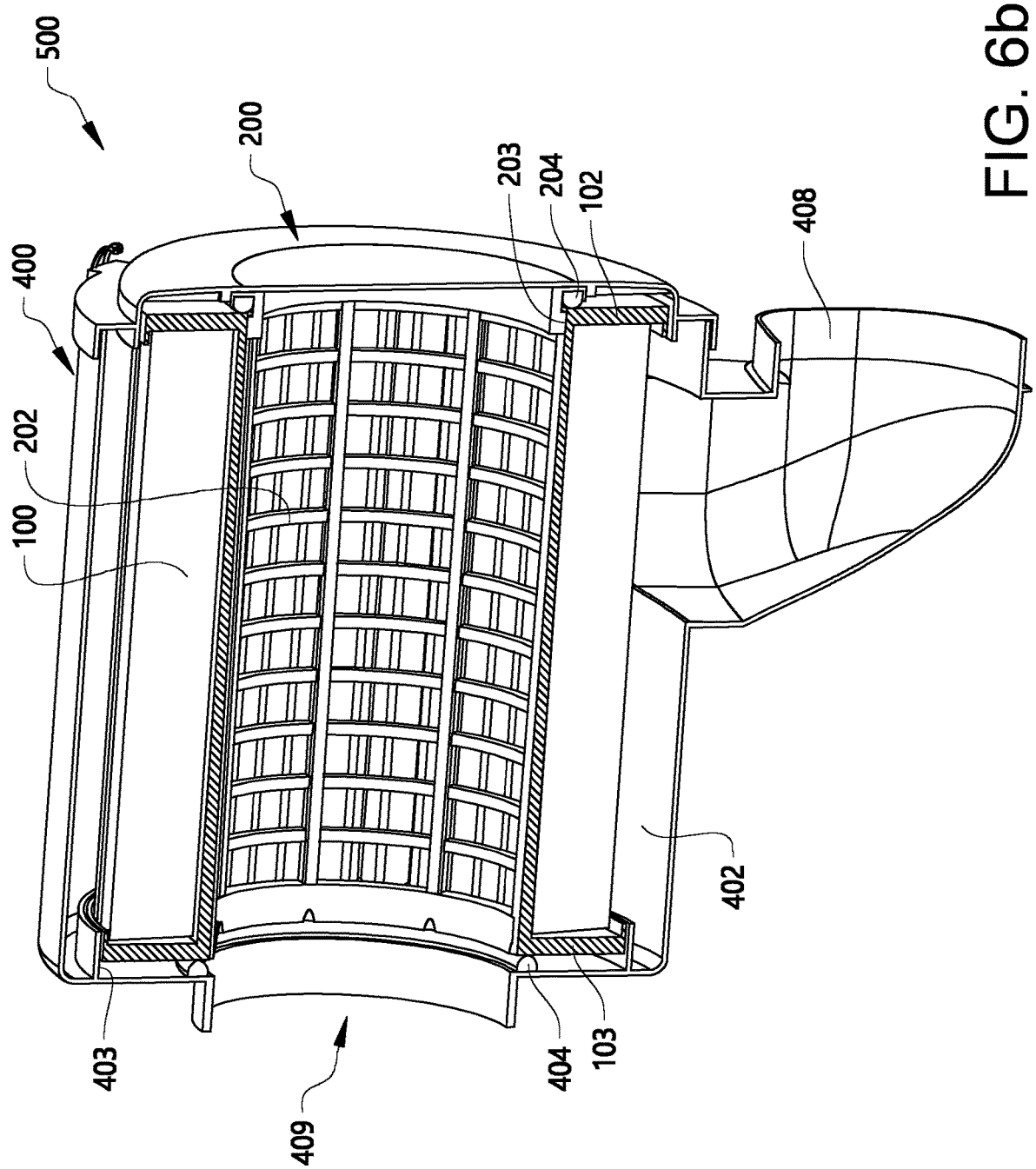
FIG. 6b is a cross-sectional view of an embodiment of an air cleaner arrangement 500 of FIG. 5b, comprising a housing and the air cleaner assembly of FIGS. 4c, 4d.

FIG. 6b is similar to FIG. 6a, but illustrates an embodiment where the reusable carrier structure 200 is as described in relation to FIGS. 4c and 4d. Hence, the reusable carrier structure 200 does not comprise any support member 202. Instead, the filter unit 100 alone extends axially from the first receiving member 203 to the second receiving member 204.

In both embodiments 6a and 6b, the disposable filter unit 100 is attachable and removable by axial displacement of the reusable carrier structure 200 in relation to the filter housing 400, so as to enable replacement of the disposable filter unit 100.

This is described in relation to FIGS. 7a to 7d. The method for replacing a disposable air filter unit 100 in an air cleaner arrangement 500 is illustrated with reference to the embodiments of FIGS. 4a, 4b and 6a, but may be equally applied to the embodiment of FIGS. 4c, 4d and 6b, or to other embodiments.

Figure 7A:
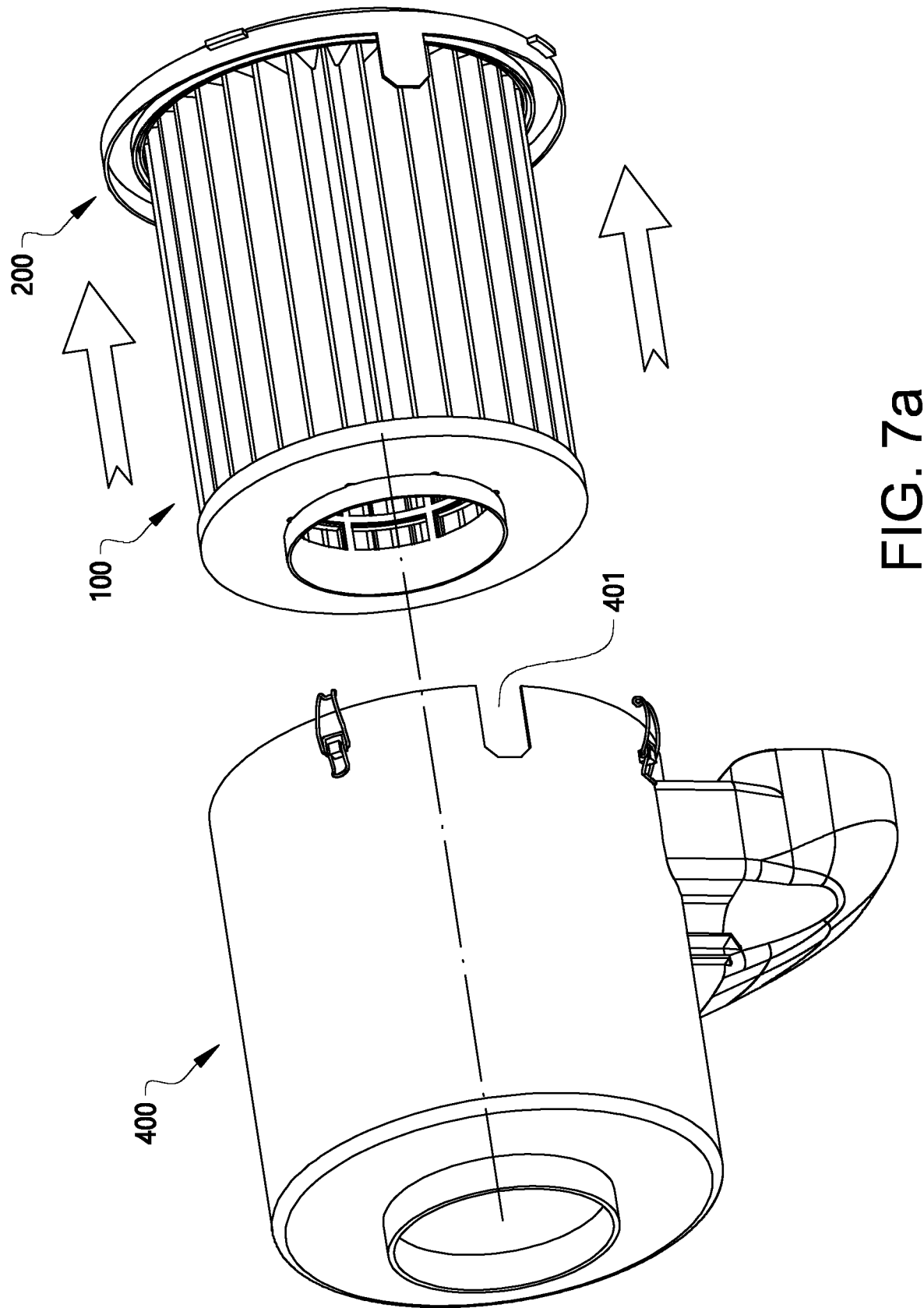
FIGS. 7a to 7d illustrate an embodiment of a method for replacing a disposable air filter unit.

In FIG. 7a, a first step comprises axially removing the reusable support structure 200 carrying a used air filter unit 100 from the filter cavity 401 of the filter housing 400.

Figure 7B:
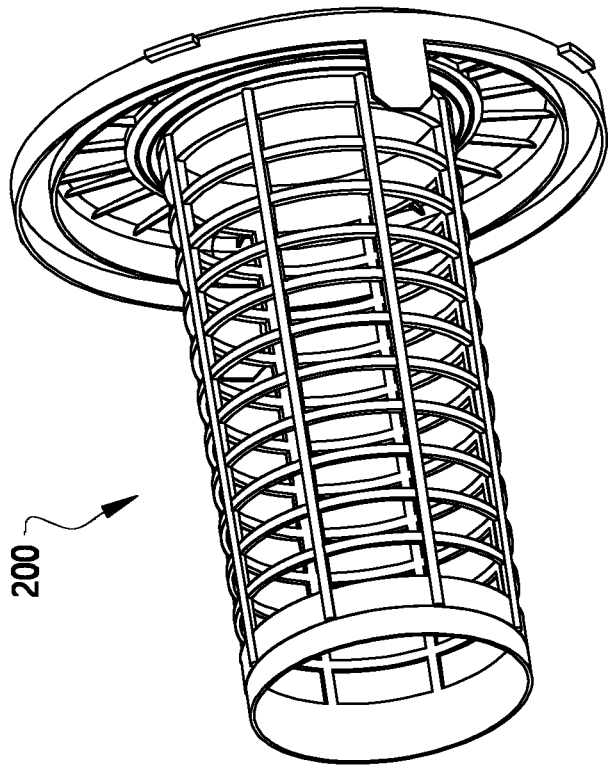
Figure 7B:
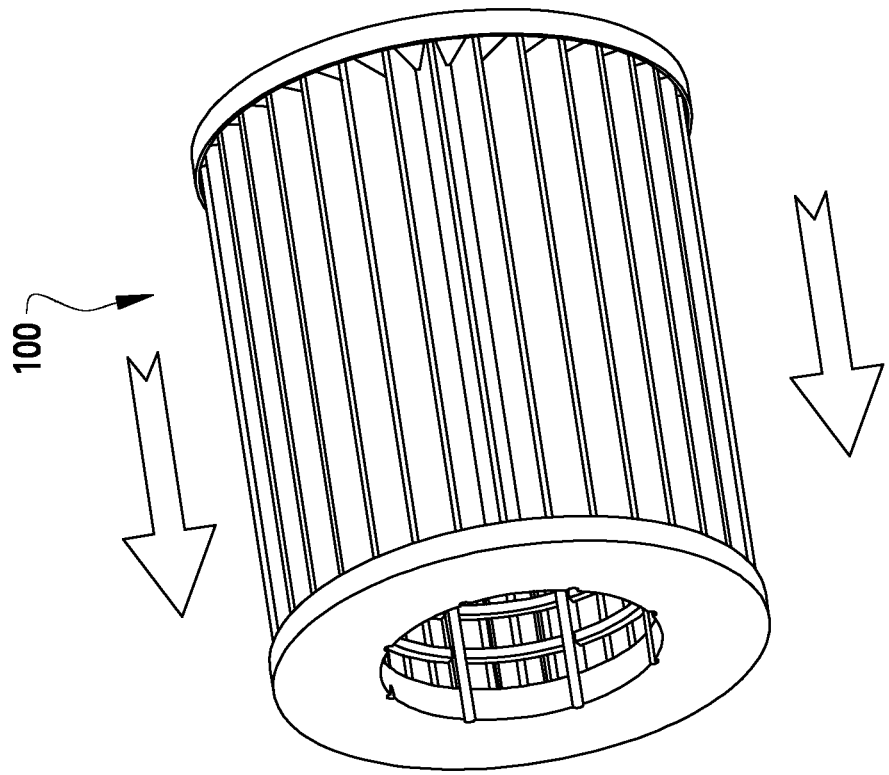

In FIG. 7b, a second step comprises axially removing the used air filter unit 100 from the reusable support structure 200.

Figure 7C:
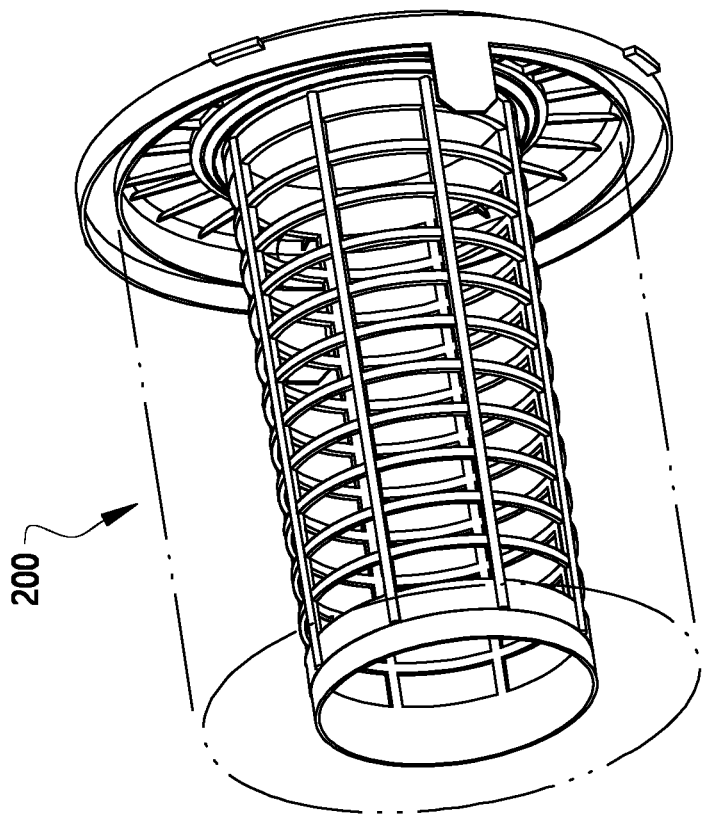
Figure 7C:
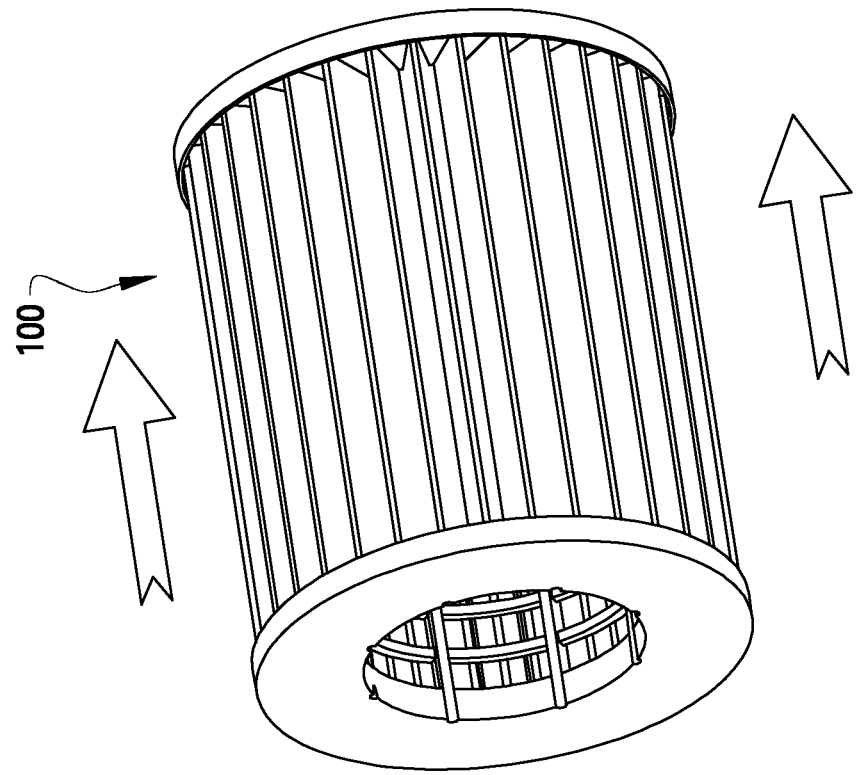

In FIG. 7c, a third step comprises axially applying an air filter unit 100 to the reusable support structure 200. As mentioned in the above, preferably the used air filter unit 100 of FIGS. 7a and 7b is discarded, and a new unused air filter unit 100 is applied to the reusable support structure 200 in the third step.

Figure 7D:
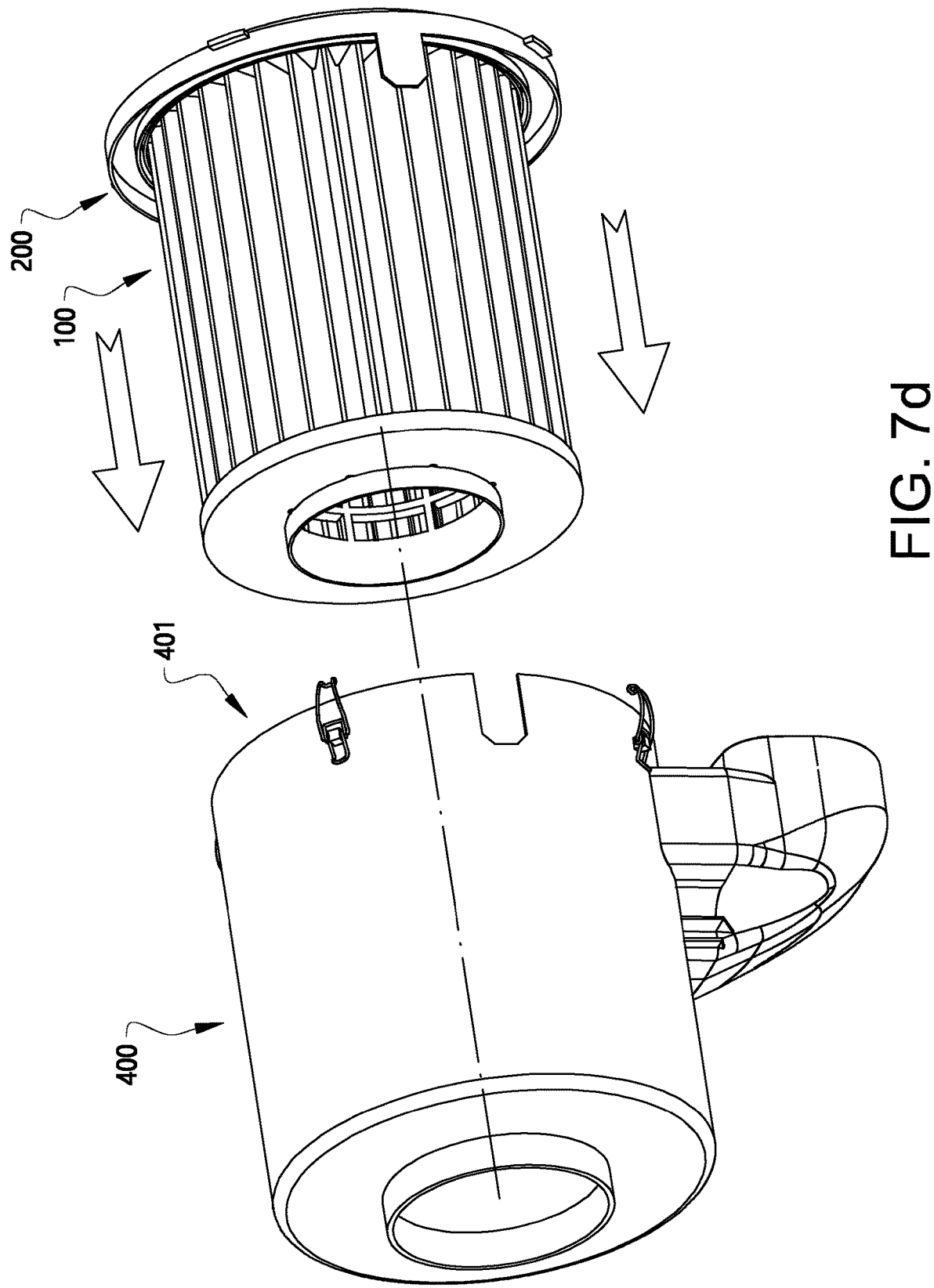

In FIG. 7d, a fourth step comprises axially introducing the reusable support structure 200 carrying the filter unit 100 into the filter cavity 201 of the filter housing 400.

Once in place, the support structure 200 may be locked to the filter housing 400 using the axial locking means 207, 407.

Hence, steps 7b and 7c may be performed by a service technician at any location remote from the filter housing, meaning that an ergonomically suitable working position may be selected.

It is to be understood that the present invention is not limited to the embodiments described above and illustrated in the drawings; rather, the skilled person will recognize that many changes and modifications may be made within the scope of the appended claims.

The invention claimed is:

1. An air cleaner assembly for an air cleaner arrangement in a vehicle, comprising:
   a disposable air filter unit, and
   a reusable carrier structure to which said air filter unit is removably arranged, the disposable air filter unit forming a sleeve about a central axis, extending axially between a first end surface and a second end surface, and forming an outer sleeve surface for receiving unfiltered air, and an inner sleeve surface for output of filtered air,
   wherein the reusable carrier structure comprises a receiving member for receiving said first end surface of the air filter unit, and a sealing member arranged at the receiving member, to contact said first end surface of the air filter unit,
   wherein the reusable carrier structure comprises a support member extending axially from said receiving member to a free end, the support member being adapted to be surrounded by said inner sleeve surface of the air filter unit, and
   wherein the air filter unit comprises a pleated filter component and a bioplastic reinforcement structure, arranged at the pleated filter component.

2. An air cleaner assembly according to claim 1, wherein said sealing member extends annularly around said support member.

3. An air cleaner assembly according to claim 1, wherein said support member comprises axially extending guiding means for guiding said air filter unit during attachment and removal thereof from the reusable carrier structure.

4. An air cleaner assembly according to claim 1 wherein said free end of the support member comprises a connector for connecting said free end to an air filter housing.

5. An air cleaner assembly according to claim 1, wherein said reusable carrier structure comprises an enclosure portion adapted to form part of a filter enclosure of an air filter housing.

6. An air cleaner assembly, according to claim 1, wherein an axial length of the support member from the receiving member to the free end corresponds to at least 20% of a length between the first end surface and the second end surface of the filter unit.

7. An air cleaner arrangement comprising a filter housing, and a reusable carrier structure for carrying a disposable air filter unit,
which air filter unit is forming a sleeve about a central axis and extending axially between a first end surface and a second end surface and defining an outer sleeve surface for receiving unfiltered air, and an inner sleeve surface for output of filtered air;
the reusable carrier structure comprising a first receiving member for receiving said first end of the air filter unit, and a first sealing member arranged at the receiving member, the first sealing member being adapted to interact with said first end surface of the air filter unit;
the filter housing defining an air filter cavity having an inner wall, the inner wall comprising a second receiving member for receiving the second end surface of the air filter unit, and a second sealing member arranged at the second receiving member, the second sealing member being adapted to interact with said second end surface of the air filter unit, wherein the reusable carrier structure comprises a support member extending axially from said receiving member to a free end portion, the support member adapted to be surrounded by said inner sleeve surface of the air filter unit, said first sealing member being arranged annularly around said support member.

8. An air cleaner arrangement according to claim 7, wherein the inner wall of the filter cavity comprises a support member receiving element adapted to receive the free end portion of the support member of the reusable carrier structure.

9. An air cleaner arrangement according to claim 8, wherein the support member receiving element comprises an annular groove for receiving an edge of said free end portion.

10. An air cleaner arrangement according to claim 7, wherein the reusable carrier structure comprises an enclosure portion adapted to complement the inner wall of the filter cavity, so as to, when the reusable carrier structure is arranged in the filter housing, join the inner wall of the filter cavity, so as to form a closed air filter compartment.

11. An air cleaner arrangement according to claim 7, wherein the reusable carrier structure and/or the filter housing comprises axial locking elements for axially securing the reusable carrier structure to the filter housing.

12. An air cleaner arrangement according to claim 7, wherein the filter housing further defines a peripherally arranged air inlet, and an axially arranged air outlet, said second receiving member and said second sealing member being arranged to surround said air outlet.

13. An air cleaner arrangement according to claim 7, further comprising a disposable filter unit, said disposable filter unit being clamped between said first receiving member and said second receiving member, such that the first sealing member sealingly contacts the first end surface of the filter unit, and the second sealing member sealingly contacts the second end surface of the filter unit, when the air cleaner arrangement is in a use condition.

14. An air cleaner arrangement according to claim 13, wherein the disposable filter unit is removable by axial removal of the reusable carrier structure from the filter housing from said use condition to an open condition.

15. A method for replacing a disposable air filter unit in an air cleaner arrangement according to claim 7, comprising;
removing the reusable support structure carrying a used air filter unit from the filter cavity of the filter housing,
removing the used air filter unit from the reusable support structure;
applying a disposable air filter unit to the reusable support structure; and
introducing the reusable support structure into the filter cavity of the filter housing.

16. A vehicle comprising an air filter assembly according to claim 1.

17. A vehicle comprising a filter arrangement according to claim 7.

18. An air cleaner assembly according to claim 6, wherein the axial length of the support member from the receiving member to the free end corresponds to at least 75% of the length between the first end surface and the second end surface of the filter unit.

19. An air cleaner assembly according to claim 6, wherein the axial length of the support member from the receiving member to the free end corresponds to at least the length between the first end surface and the second end surface of the filter unit.

20. An air cleaner arrangement according to claim 9, wherein said second sealing member is arranged outward of said annular groove.

* * * * *